UNITED STATES PATENT OFFICE.

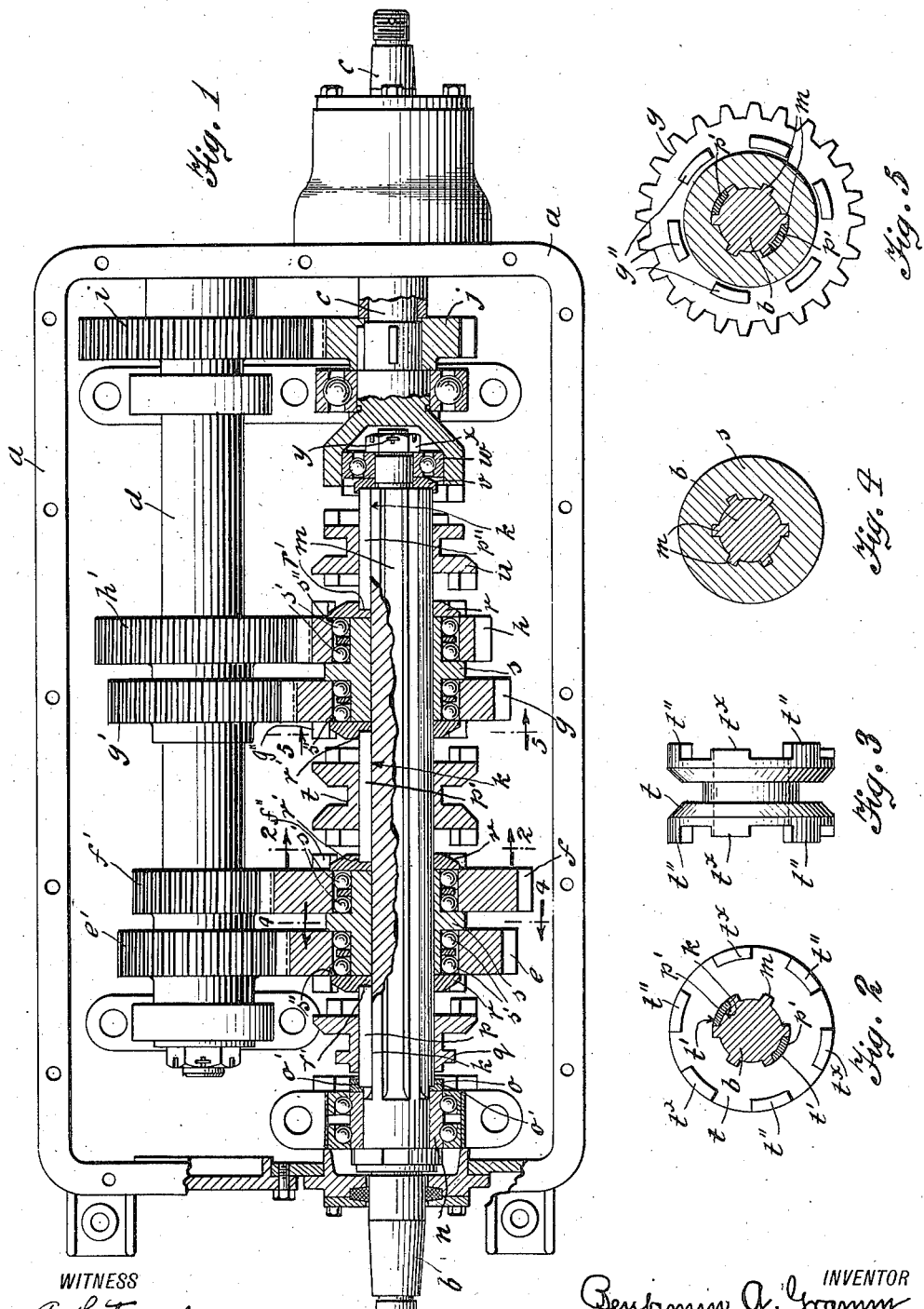
B. A. GRAMM.
TRANSMISSION MECHANISM.
APPLICATION FILED FEB. 12, 1916.
1,183,296.
Patented May 16, 1916.
WITNESS
A. Gutznagel
INVENTOR
Benjamin A. Gramm
BY
James Hamilton
ATTORNEY

BENJAMIN A. GRAMM, OF LIMA, OHIO.

TRANSMISSION MECHANISM.

1,183,296.  Specification of Letters Patent.  Patented May 16, 1916.

Application filed February 12, 1916. Serial No. 77,830.

*To all whom it may concern:*

Be it known that I, BENJAMIN A. GRAMM, a citizen of the United States of America, residing at Lima, in the county of Allen and State of Ohio, have invented certain new and useful Improvements in Transmission Mechanisms, of which the following is a specification, reference being had to the accompanying drawings.

This invention relates to improvements in transmission mechanisms for use in self-propelled vehicles, such as automobiles, motor-trucks and the like; and an object of this invention is to provide a transmission mechanism in which the gears, cores, slidable clutch-members and other parts of the transmission mechanism are held firmly in place on the transmission-shaft and the use of numerous screws, nut and pins (which are never satisfactory in operation) is avoided.

Another object of this invention is to provide a transmission mechanism in which the slidable clutch-members are formed with jaws some of which are lower than others, whereby it is insured that the jaws on the slidable clutch-member cannot slip past more than one of the jaws formed on a lateral face of the gear without becoming engaged therewith.

Other features of this invention are set out in the description and claims which follow hereinafter.

In the drawings illustrating the principle of this invention and the best mode now known to me of applying that principle, Figure 1 is a plan view of a transmission mechanism embodying this invention, parts being shown in section for clearness and the cover of the transmission case being omitted; Fig. 2 is a section on the line 2—2 of Fig. 1; Fig. 3 is an elevation of a slidable clutch-member; Fig. 4 is a section on the line 4—4 of Fig. 1; and Fig. 5 is a section on the line 5—5 of Fig. 1.

In the transmission-case $a$, there is rotatably mounted the transmission-shaft $b$, the engine-shaft or motor-shaft $c$ and the counter-shaft $d$. On the transmission-shaft $b$, there are loosely mounted the idler-gears $e, f, g$ and $h$ which mesh, respectively, with the gears $e', f', g'$ and $h'$ that are mounted fast on the counter-shaft $d$. On the latter shaft, there is mounted fast a spur-gear $i$ which meshes with a pinion $j$ that is keyed on the engine-shaft $c$. The arrangement of the parts so far described is old. The transmission-shaft $b$ is formed with several lengthwise-extending grooves $k$ and with splines or ribs $m$ (that is, the transmission-shaft $b$ is a splined shaft). This transmission-shaft $b$ is journaled at its rear end in an annular double-row ball-bearing $n$ against which there is forced a ring $o$ formed with an annular recess $o'$. In the grooves $k$, there are slipped spacer-keys $p$ the rear ends of which are forced into the recess $o'$ in the ring $o$. Over these spacer-keys $p$, there is now slipped into place the reversing dog or clutch-member $q$; after which an annular cap $r$ is pressed tightly against the spacer-keys $p$, the front ends of which enter a recess $r'$ formed in this annular cap $r$. Since the ends of the spacer-keys $p$ are securely held by the walls of the recesses $o', r'$, these spacer-keys $p$ are firmly held down in place in the grooves $k$ in the transmission-shaft $b$. On the latter, there is next slipped the core $s$, together with the ball-bearings $s'$ and the gears $e, f$. There is then mounted, on the transmission-shaft $b$, a second annular cap $r$ formed with a recess $r'$ into which are driven the rear ends of the spacer-keys $p'$ that are mounted in grooves $k$ formed in the transmission-shaft $b$. Over these spacer-keys $p'$, there is slipped the slidable clutch $t$; and the front ends of these spacer-keys $p'$ are held in a recess $r'$ formed in a third annular cap $r$. A second core $s$ is then mounted on the transmission-shaft $b$, together with ball-bearings $s'$ and the gears $g, h$. A fourth annular cap $r$ is then slipped on the transmission-shaft $b$ and the rear ends of the spacer-keys $p''$ are forced into the recess $r'$ formed in this cap $r$. A dog or clutch member $u$ is then slipped over the spacer-keys $p''$, after which a washer $v$ is forced over the front ends of the latter. The bearing $w$ is next slipped over the front end of the transmission-shaft $b$ and a nut $x$ is screwed on the threaded front end thereof and is held in place by a cotter-pin $y$. It is to be noted that this nut $x$ and cotter-pin $y$ are the only nut and pin used in the assembly of the parts hereinbefore described. The holes $t'$ formed in the slidable clutch-member $t$ afford room for the spacer-keys $p'$ and permit this slidable clutch to be shoved back and forth along the transmission-shaft over these spacer-keys $p'$.

The slidable clutch member $t$ is formed with jaws $t''$ between which are located jaws $t^x$ that are about one-eighth of an inch lower than the jaws $t''$. This novel feature of construction of the clutch-member $t$ results in insuring that the jaws $t''$ of the clutch-member $t$ will engage with the clutch-jaws $f''$, $g''$, formed on lateral faces of the gears $f$, $g$, respectively, without slipping past more than one of these jaws $f''$, $g''$.

It is to be observed that the annular retaining devices $r$ not only serve to hold the spacer-keys $p$, $p'$, $p''$, in the grooves $k$ in the shaft $b$, but also serve to keep the balls $s'$ in the outer races $s''$ of the cores or mountings $s$ for the toothed wheels $e$, $f$, $g$, $h$. The spacer-keys maintain the wheel-mountings $s$ in definite spaced relation with respect to each other.

I claim:

1. The combination of a shaft formed with grooves; spacer-keys mounted in said grooves; and wheel-mountings on said shaft and between said spacer-keys, which hold said wheel-mountings in spaced relation.

2. The combination of a shaft formed with grooves; spacer-keys mounted in said grooves; a wheel mounting on said shaft, along which said wheel-mounting is spaced by said spacer-keys; a clutch-member slidably mounted on said shaft and keyed thereto by said spacer-keys; and a wheel mounted on said wheel-mounting and arranged to be clutched by said clutch-member.

3. The combination of a shaft formed with grooves; spacer-keys mounted in said grooves; means for holding said spacer-keys in said grooves; and wheel-mountings on said shaft and between said spacer-keys, which hold said wheel-mountings in spaced relation.

4. The combination of a shaft formed with grooves; spacer-keys mounted in said grooves; wheel-mountings on said shaft and between said spacer-keys, which hold said wheel-mountings in spaced relation; and retaining devices formed with recesses the walls of which engage the ends of said spacer-keys and retain the latter in said grooves.

5. The combination of a shaft formed with grooves; spacer-keys mounted in said grooves; wheel-mountings on said shaft and between said spacer-keys, which hold said wheel-mountings in spaced relation, said wheel-mountings being formed with ball-races; balls in said races; wheels mounted on said wheel-mountings and retaining devices formed with recesses the walls of which engage the ends of said spacer-keys and retain the latter in said grooves and said balls in said races.

Signed at the borough of Manhattan, city, county and State of New York, this third day of February, A. D., 1916, in the presence of the two undersigned witnesses.

BENJAMIN A. GRAMM.

Witnesses:
 ELEANOR FISHER,
 H. E. WHEELER.